United States Patent

Lalor

[11] Patent Number: 4,645,549
[45] Date of Patent: Feb. 24, 1987

[54] COMPOSITE TAPES AND APPARATUS FOR WINDING COMPOSITE TAPES

[76] Inventor: Walter T. Lalor, 35 Park Lane, Godmanchester, Huntingdon, Cambridge, England

[21] Appl. No.: 798,157

[22] Filed: Nov. 15, 1985

Related U.S. Application Data

[63] Continuation of Ser. No. 296,079, Aug. 25, 1981, abandoned, which is a continuation-in-part of Ser. No. 151,553, May 20, 1980, abandoned.

[30] Foreign Application Priority Data

Nov. 8, 1978 [GB] United Kingdom ............... 7843610

[51] Int. Cl.4 ........................................... H01B 13/06
[52] U.S. Cl. ..................................... 156/54; 156/201; 156/202; 156/463; 156/467; 174/117 FF
[58] Field of Search ............................... 156/200–202, 156/461, 463–464, 467, 52–54, 56; 174/117 FF, 117 A, 119 R; 428/124, 126

[56] References Cited

U.S. PATENT DOCUMENTS

| 253,428 | 2/1882 | Ridgway | 156/463 |
| 750,563 | 1/1904 | Anderson | 156/54 |
| 753,461 | 3/1904 | Anderson | 174/117 FF |
| 999,772 | 8/1911 | Fortescue | 156/467 |
| 3,234,063 | 2/1966 | Masini | 156/467 X |
| 4,115,180 | 9/1978 | Scalia | 156/461 X |

FOREIGN PATENT DOCUMENTS 588898 2/1959 Italy ............................. 174/117 FF Primary Examiner—David Simmons
Attorney, Agent, or Firm—Cushman, Darby & Cushman

[57] ABSTRACT

A composite tape primarily for use in transformer winding as an electric screen and having a backing layer of Melinex plastics tape (112) folded around a metal foil strip of copper (110), and a strip of adhesive PVC tape (114) applied to the folded round edges, is formed by a machine having a braked spool (48) of PVC tape (52) which is fed around a roller (36) with a copper foil strip (58) from a braked second spool (56), sandwiched between the tape (52) and the roller (36), and guide rollers (40, 42) which turn in the outermost edges of the tape (52) to overlie the foil (58), whereafter adhesive tape (66) from a braked third spool is applied to the overlapping edges of the tape (52) by a roller (68) and the composite tape is fed through an outlet roller guide (74).

1 Claim, 6 Drawing Figures

COMPOSITE TAPES AND APPARATUS FOR WINDING COMPOSITE TAPES

RELATED APPLICATION

This is a continuation of application Ser. No. 296,079, filed Aug. 25, 1981, which was abandoned, which is a continuation-in-part of my application Ser. No. 151,553 filed May 20, 1980, now abandoned and entitled Improvements in and relating to composite tapes and apparatus for winding composite tapes.

FIELD OF INVENTION

This invention concerns composite tapes and apparatus for forming composite tapes. By composite tape is meant a tape formed from two or more elongate components. One example of a composite tape is an insulated metal foil screen for use in the winding of transformers and the like, and the present invention primarily concerns a machine for forming such an insulated metal foil screen.

BACKGROUND TO THE INVENTION

It is known to provide electrostatic screens in coil winding, the screen serving the dual purpose of insulating one winding from another and also providing an electrostatic screen to prevent unwanted spurious transfer from one winding to another in a transformer. Whilst the winding of the wire to form a coil has been a rapid process the interleaving of one winding with another by an electrostatic insulating screen has often introduced considerable delays into the process of coil winding particularly where the insulating material and metal foil has had to be interleaved by hand.

It is obviously imperative that the metal foil is fully insulated from both windings and also from itself so that an electrical short circuit does not occur and further delays have been experienced in the past while insulation tests have been carried out prior to continuing winding.

It is an object of the present invention to provide apparatus for pre-forming an insulating electrostatic screen which can be wound directly around a coil during manufacture and which will have reliable insulating properties.

It is another object to provide an improved composite tape.

PRIOR ART

In the prior art U.S. Pat. No. 3,118,803 describes apparatus for the production of composite elastic banding. In this known apparatus, by use of suitable storage rollers and composite band forming rollers, a textile strip is laid against an elastic strip and then wrapped around it and adhesively attached thereto in a wrapped condition. Since the aim is to provide an elastic banding, the elastic strip is stretched while being wrapped and the stretching action is not relaxed until the textile wrapping has been adhesively attached. When the elastic core of the bonding is relaxed, the textile covering, which is only adhesively attached at spaced points in its length, is able to pucker to accommodate the contraction of the core.

Apparatus for producing elastic banding of this type is clearly unsuited to the production of composite tape of the type to which the present invention relates, which must be both flat and as far as possible untensioned in its finished state.

BRIEF SUMMARY OF THE INVENTION

According to the present invention apparatus for forming an insulated electrostatic screen for electrical coils comprises first roller storage means of metalised foil, second roller storage means of plastics insulating tape which is approximately twice the width of the metalised foil, first roller means around which both the foil and the plastics insulating tape can be passed with the metalised foil sandwiched between the roller and the insulating tape and located centrally of the tape, second roller means beyond the first roller means which progressively cause the free edges of the plastics insulating tape on either side of the metal foil to be turned upwardly and over the foil as it passes through the second roller means, third roller storage means having wound thereon self adhesive plastics insulating tape and third roller means below which the self adhesive insulating tape is passed with the self adhesive surface away from the roller for urging the adhesive surface into contact with the two folded-over edges of the plastics insulating tape to cause the self adhesive tape to adhere thereto, fourth roller means between which the composite tape is passed for exerting pressure on opposite sides of the composite tape to ensure good adhesion between the adhesive tape and the plastics insulating tape, first braking means associated with the first roller storage means to resist rotation thereof and thereby maintain a slight tension in the metalised foil tape, and second braking means associated with the second roller storage means to resist rotation thereof and thereby maintain a greater tension in the insulating tape than in the metalised foil tape.

FURTHER FEATURES OF THE INVENTION

Preferably, each of the first and second braking means is adjustable for changing the tension imparted to the metalised foil and to the insulating tape.

There may be third braking means associated with the third roller storage means for imparting to the self adhesive plastics insulating tape a tension generally equivalent to residual tension in the combination of the metalised foil and plastics insulating tape turned thereover, and such third braking means may be adjustable for changing the tension imparted to the self adhesive tape.

Preferably two or more first roller storage means are provided for the plastics insulating tape to allow one, two or more thicknesses of insulating tape to be employed.

The width of the plastics insulating tape may be just less than twice the width of the metal foil around which it is to be wrapped so that a gap exists between the turned-over edges of the plastics insulating tape along the length of the composite tape so that the self adhesive surface of the plastics tape which is applied to the turned-over edges makes contact with the exposed surface of the metal foil to more securely anchor the latter in the composite tape.

Alternatively, the width of the plastics insulating tape may be such as to provide an overlap thereof in its wrapped condition, so that the inner foil tape is only held in position by friction. It is then possible to pull out a short length of the inner foil from a severed composite tape in order to make an electrical connection thereto.

Means may be provided for adjusting the pressure between the rollers forming the said fourth roller means to compensate for different thicknesses of composite tape.

Preferably means is provided for altering or replacing the rollers of the said third roller means to accommodate different widths of insulating tape.

The fourth roller means may be adjustable to accommodate different widths of composite tape.

The apparatus can be incorporated directly into a coil winding machine so that the formed composite tape is simply pulled from the fourth roller means as and when required and wound around the coil on the machine. To this end the invention also provides a coil winding machine when fitted with apparatus embodying the invention.

Alternatively the apparatus may include a coil winding bobbin and drive means for preparing bobbins of composite insulating electrostatic screen which can then be stored on the bobbin either for subsequent use or for sale.

The invention also provides a composite tape when formed by apparatus embodying the invention which comprises an outer flattened sleeve of electrically insulating material within which is located an elongate electrically conductive foil.

The outer sleeve is conveniently formed from a first elongate strip of insulating plastics film the width of which is equal to or just less than twice the width of the electrically conductive foil and in forming the outer sleeve, the foil is positioned midway across the width of the insulating film with one surface of the foil in contact with the film and the two edges of the film not covered by the foil are folded up and over to overlie the said other face of the foil and are secured in position by means of an elongate strip of plastics film which is bonded to the two turned-over edges of the first mentioned film.

Preferably the elongate strip of insulating material which is bonded to the two overlying edges of the first mentioned film comprises self adhesive plastics insulating tape.

Preferably the width of the first mentioned plastics film is less than twice the width of the foil so that the opposite edges of the first mentioned foil do not meet when turned over and folded onto the foil. In this way a central strip of the foil is exposed to the adhesive backed surface of the self-adhesive plastics tape when the latter is applied to the turned-over edges of the first mentioned plastics film and adhesion between the foil and the self adhesive plastics strip is obtained. In this way the foil is secured in position within the outer sleeve of plastics film.

Preferably the self adhesive plastics strip is self-coloured and preferably a different colour is used to denote a different standard of manufacture of the composite tape. Thus where a double thickness of insulating film material has been used one colour self adhesive tape may be employed and where only a single layer of insulating plastics film has been used to form the outer sleeve, another colour of self adhesive plastics tape may be employed.

BRIEF DESCRIPTION OF DRAWINGS

The invention will now be described by way of example with reference to the accompanying drawings in which.

DESCRIPTION OF EMBODIMENT

Figure 1:
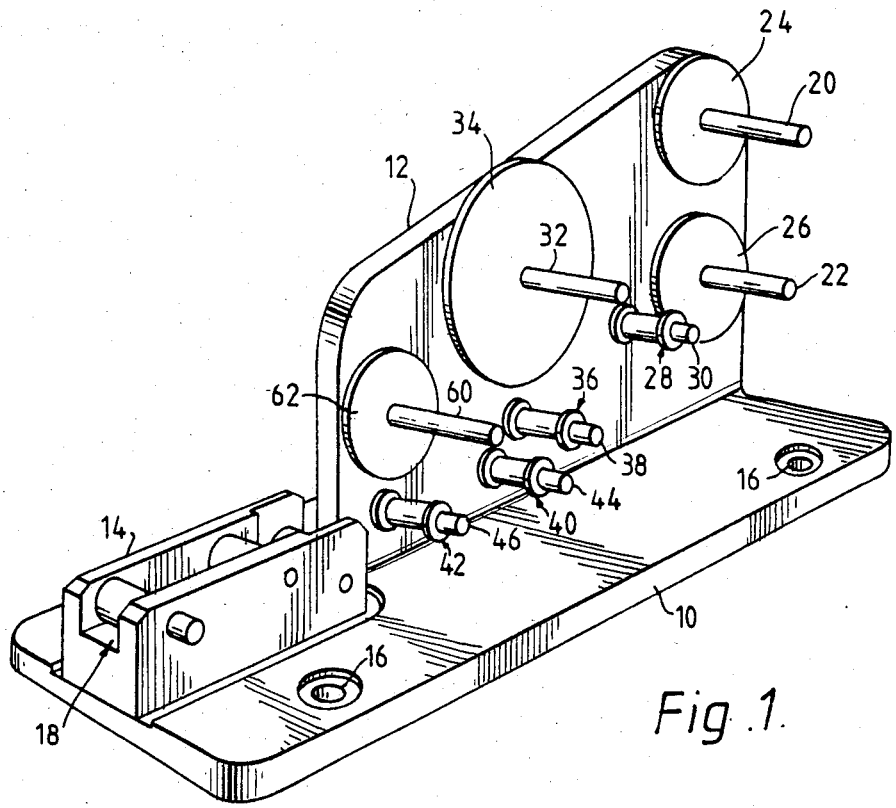
FIG. 1 is a perspective view of apparatus embodying the invention.

Referring to FIG. 1 the apparatus comprises a base 10 having an upstanding support flange 12 for carrying various drum storage devices to be described hereinafter.

In line with the support flange 12 is provided a channel support 14 forming the exit for the apparatus through which the formed screen tape is passed and for housing rollers (to be described later) for performing the final forming operation of the composite screen tape.

The base includes fixing holes 16 by which the apparatus can be clamped to a bench or to a coil winding machine or the like.

As described hitherto the apparatus is self sufficient in that tape can be pulled directly from the exit at 18 or the apparatus can be combined with a coil winding machine to allow the screen tape to be pulled from the exit as and when required and wound directly on a coil bobbin or it can be combined with a coil winding bobbin and drive means for winding bobbins of the insulating electrostatic screen for storing the screen material in bulk either for subsequent use or for sale.

Referring again to FIG. 1, two spindles 20 and 22 extend at the rear of the flange 12 and include backing discs 24 and 26. The spindles are adapted to receive and support reels of tape typically Melinex tape to form the electrically insulating outer covering of the composite electrostatic screen tape. The reels are not shown in FIG. 1 but as hereinafter described the fitting of the reels on the spindles 20 and 22 is arranged to introduce a small degree of friction to resist rotation of the reels as the tape is pulled therefrom to impart a degree of tension into the tape as it is removed.

A take-off roller 28 is mounted on a further spindle 30 which extends from the flange 12 and around which the insulating tape from spools mounted on the spindles 20 and 22 can be passed.

It should be explained at this point that the two spindles 20 and 22 are provided so that two layers of insulating tape can be incorporated into the manufacture of the composite tape. However for some applications only one layer of insulating Melinex tape will be required in which event the tape from only one of the reels mounted on the spindles 20 and 22 is drawn off and passed around the roller 28.

A reel of metalised foil typically copper tape is mounted on a third spindle 32 which also extends from the flange 12 and includes a backing disc 34. Again the reel of metalised foil is preferably mounted on the spindle 32 so that there is a small resistance to rotation on the spindle so as to impart a slight tension to the copper tape as it is pulled therefrom. In practice the resistance to the removal of the copper tape should only be small since the metal tape will not stretch in the same way as will the Melinex.

The metal tape passes around a further roller 36 carried on a spindle 38 which also extends from and is supported by the flange 12. The metal tape is trapped between the roller 36 and the layer or layers of Melinex tape from the roller 28.

Further rollers 40 and 42 also formed with side flanges are mounted on spindles 44 and 46 respectively and the space in between the side flanges of the rollers 40 and 42 is progressively reduced so that the sides of the Melinex tape which is wider than the metal tape are caused to be turned up and over the metal tape.

Figure 3A:
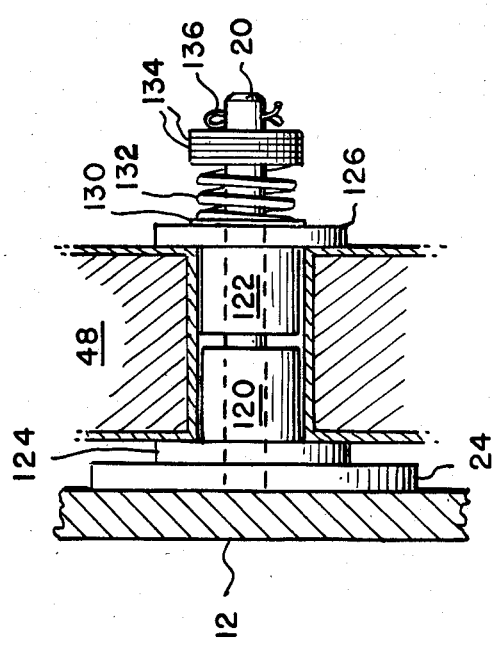
FIG. 3A is an enlargment showing a braking means for a storage drum.
Figure 3:
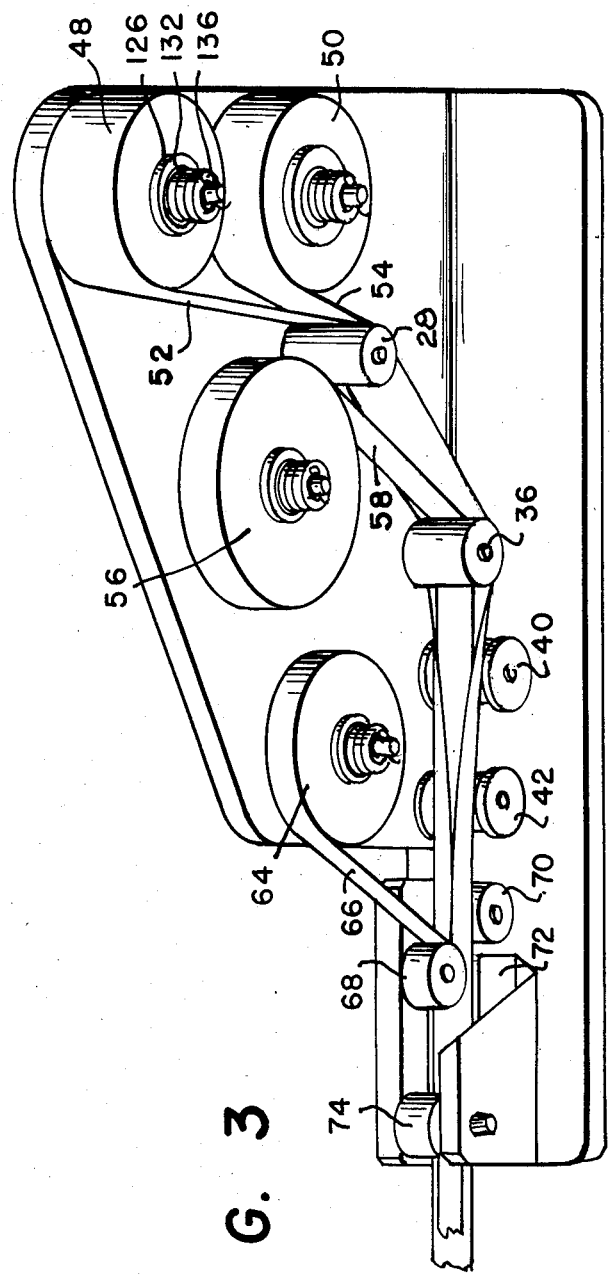
FIG. 3 is a perspective view of the apparatus of FIG. 1 when fitted with storage drums of the various component tapes to make the composite insulating electrostatic screen with the various component tapes threaded through the apparatus to indicate the mode of operation of the apparatus.

This is best seen with reference to FIG. 3 in which two reels of Melinex tape at 48 and 50 supply two layers of tape 52 and 54 around the roller 28 (the roller in FIG. 3 being shown somewhat diagrammatically). A further reel 56 contains copper foil as shown at 58 which passes around the roller 36 and is trapped between the roller and the two layers of Melinex tape 52 and 54.

The width of the copper foil 58 is approximately half the width of the Melinex tape and as the now composite tape passes between the flanges of rollers 40 and 42 the edges of the Melinex tape are curled up and over the copper foil as the composite tape passes between the progressively smaller spaced apart flanges.

Reverting to FIG. 1, a fourth spindle 60 is mounted on the flange 12 again with a backing disc 62 for carrying a reel of self adhesive tape not shown in FIG. 1. The reel is shown in FIG. 3 at 64 and the tape is removed as shown at 66 with the adhesive surface on the underside. The tape 66 passes underneath a roller 68 carried in the channel support means 14 and is thereby brought into contact with the turned-over edges of the Melinex tape presented to the underside of the roller 68 by means of another roller 70 also located between the sides of the channel support 14. Both rollers 68 and 70 are freely rotatable.

The composite tape then passes over a block 72 and under a final exit roller 74 forming an exit nip.

Referring to FIG. 3A, which for convenience is described with reference to the drum or reel 48, each drum or reel 48, 50, 56, 64, is carried on a cylindrical sleeve which may be in two parts 120, 122. The sleeve includes shoulders 124 and 126. In the case of the drum 48, the shoulders are clamped between a plate 24 (see FIG. 1) and a thrust washer 130 which is urged against the shoulder 126 by a spring 132 which is compressed to a preselectable extent by any desired quantity of packing washers 134 held in place by a pin 136 which passes through a hole in the end of the spindle 20.

The plate 24 is stationarily fixed and therefore has a braking effect on the shoulder 126. The degree of braking is affected firstly by the material and surface finish of the plate 24 and secondly by the adjustable degree of compression of the spring 132.

A similar braking control is provided for drums 56 and 64 and also drum 50 when provided.

The braking of the supply drums creates a tension in the tapes and foil drawn therefrom. Tension in the tape 52 (and the tape 54 when provided) is selected such that it will efficiently curl over between the rollers 40, 42 to wrap the foil 58. The latter, and likewise the adhesive tape 66, are tensioned to a lesser amount just sufficient to produce a flat, unpuckered composite tape beyond the rollers 74, when the composite tape is released from the apparatus.

It is to be noted that, if the tensioning of the tape 52 (and tape 54 if provided) is such as to take the material thereof beyond its elastic limit, the tension in the tape 66 must be adjusted so as either to increase beyond its elastic limit substantially to the same degree or must be kept to a low value just sufficient to tension the tape 66 to be flat when applied to the wrapped foil/tape combination.

Figure 2:
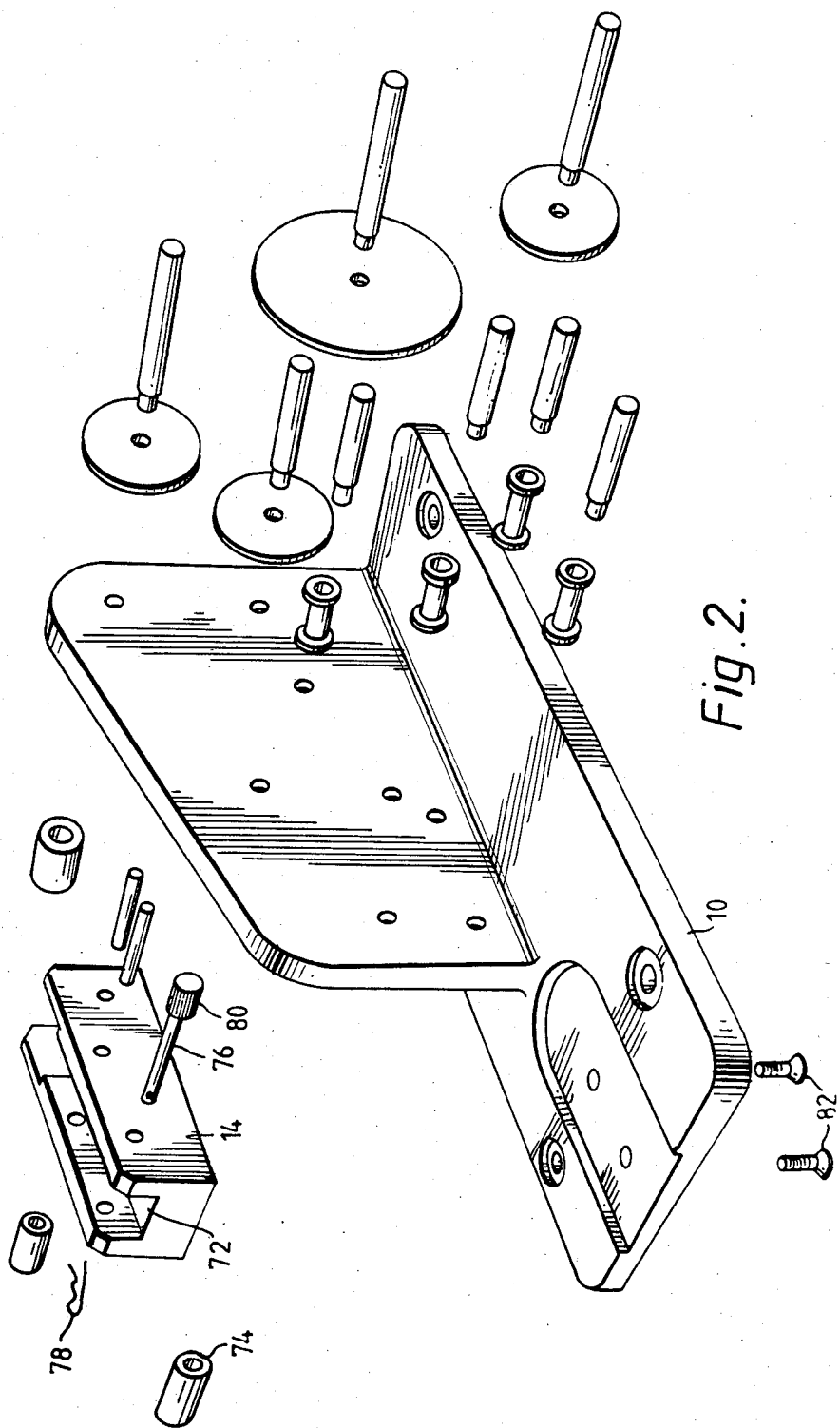
FIG. 2 is an exploded perspective view of the apparatus shown in FIG. 1.

Referring to FIG. 2 it will be seen that the exit roller 74 is mounted on a spindle 76 which can readily be removed from the channel support 14 by removing the pin 78 and withdrawing the spindle 76 using the knurled end 80. In this way the roller 74 can be removed to allow the composite tape to be threaded over the base 72 and the roller 74 replaced so as to exert the required pressure on the tape.

It will be seen that the channel section 14 can be removed from the base 10 by removing the two screws 82 and can be replaced with a different channel section with different rollers to accommodate different tape sizes or the channel section 14 may be formed from two parts which can be set at different spacings to accommodate different widths of composite tape.

Figure 4:
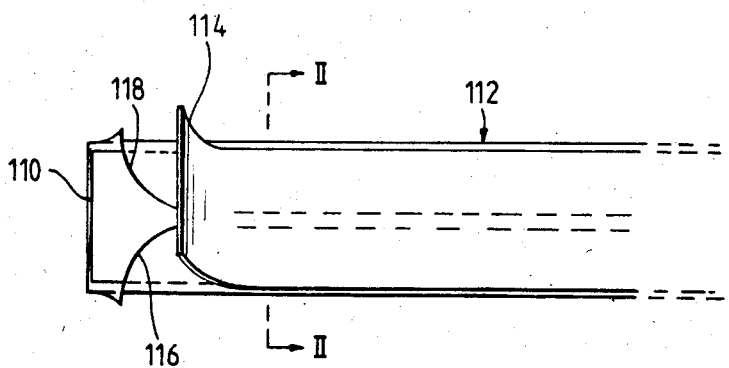
FIG. 4 is a plan view of an insulated metal foil screen for use in the winding of transformers and the like with the various component parts peeled away one from the other at the left hand end of the screen.

As shown in FIG. 4 an insulated metal foil screen for use in the winding of transformers and the like comprises a metal foil 110 typically of copper foil some few thousandths of an inch thick, a first strip of plastics film 112 the width of which is just less than twice the width of the foil 110 and a second strip or tape of semi opaque plastics sheet material 114 which is adhesively bonded to the first plastics film 112 and to the foil 110.

The foil is almost totally enclosed within a sleeve formed by the first plastics film 112 and to this end the foil 110 is located midway across the width of the film 112 and the two opposite edges of the film are folded up and over the foil 110 so as to overlie the upper surface thereof. In FIG. 4 the extreme left hand end of the strip or tape 114 is shown peeled away from the two in-turned edges 116 and 118 of the film 112 and these in-turned edges 116 and 118 are shown springing upwards away from the foil 110 with the restraining influence of the tape 114 removed.

The tape or strip 114 is self adhesive plastics tape and for convenience is self coloured rendering the tape opaque or semi opaque.

The two in-turned edges of the film 112 do not meet but present a gap through which the adhesive tape 114 can adhere to the foil 110 to locate the latter in position.

Preferred materials are copper foil for the screen 110 Melinex film for the sleeve 122 and PVC self adhesive tape for the strip 114.

Figure 5:
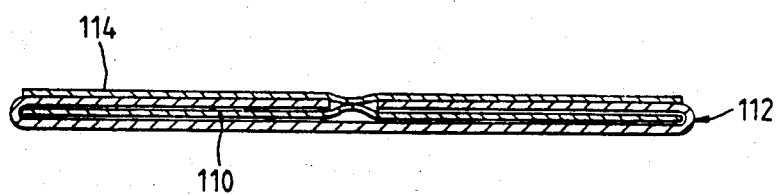
FIG. 5 is a cross-section through the tape shown in FIG. 4 at the line II—II drawn to an enlarged scale.

Although FIG. 5 shows the wrapped edges of the tape 112 as not meeting, it has been found to be desirable to arrange that the two edges at least meet and preferably overlap so that the adhesive covered tape 114 does not make contact with the metalised foil 110.

By arranging that the foil is not bonded in position, this foil is to a limited extent slidable within the wrapped around tape. This is advantageous in that the end of the foil can be pulled out from a severed end of the composite tape to allow an electrical connection to be made thereto as by soldering.

The relative movement between the foil and its wrapping permitted by such sliding is also advantageous for reducing any tendency of the composite tape to pucker when in use it is wrapped around a coil as a foil screen therein.

I claim:

1. A method for forming an insulated electrostatic screen for electrical coils comprising providing a supply of metalized foil, providing a supply of plastic insulating tape which is approximately twice the width of the metalized foil, passing foil and film from said supplies around roller means so that the metalized foil is sandwiched between said means and the insulating tape and is positioned centrally of the tape so that the edges of the tape extend outwardly beyond the film for the length thereof, maintaining the insulating tape under greater lengthwise tension than the film so that the side edges of the tape tend to curl up over the edges of the film, feeding the tape with the film so positioned thereon to and through folding means and progressively causing the edges of the insulating tape to be turned upwardly and to be folded over onto the foil as the tape and foil pass through the folding means, thereafter applying a self-adhesive plastic insulating tape over the folded-over edges of the first-mentioned tape and pressing the adhesive tape against the folded-over edges so that the adhesive and the first-mentioned tape are adhered together with the film covered completely thereby and collecting the resulting laminate comprising the fully insulated metalized film.

* * * * *